Feb. 8, 1966  C. C. SEBENA  3,233,646
ANTI-SKID DEVICE
Filed Dec. 18, 1964  2 Sheets-Sheet 1

INVENTOR.
CHARLES C. SEBENA,
BY
Berman, Davidson & Berman
ATTORNEYS.

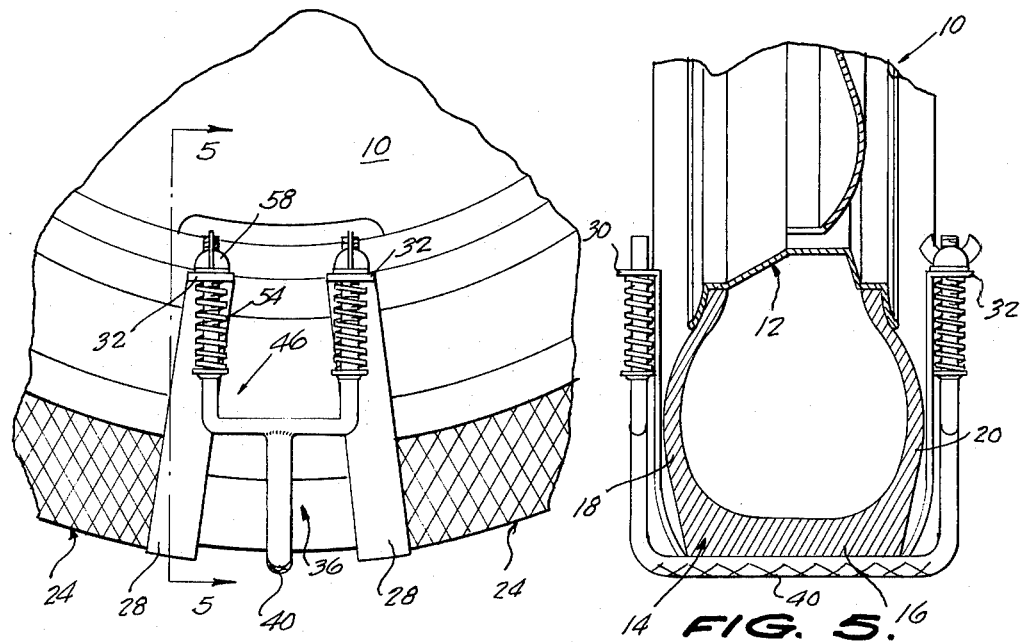
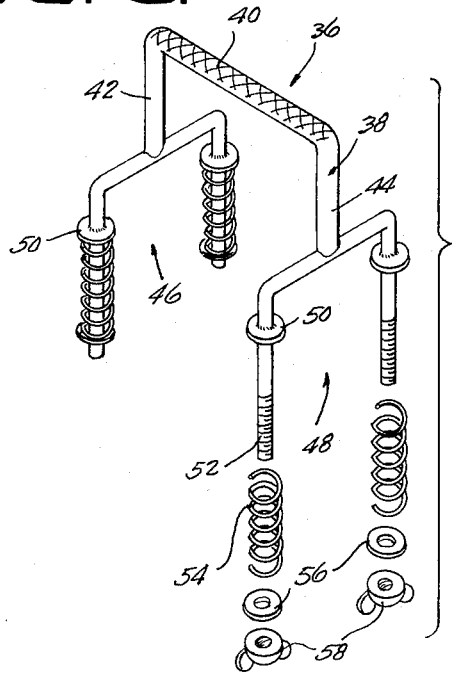
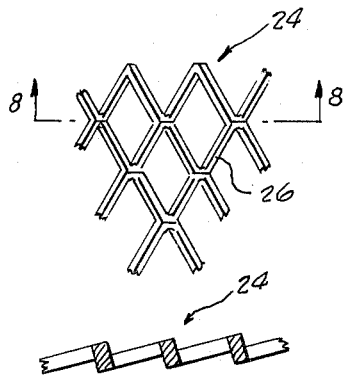

United States Patent Office 3,233,646
Patented Feb. 8, 1966

3,233,646
ANTI-SKID DEVICE
Charles C. Sebena, Worth, Ill.
(M.P.O. Box 3856, Miami, Fla. 33101)
Filed Dec. 18, 1964, Ser. No. 419,536
7 Claims. (Cl. 152—191)

This invention relates to an anti-skid device for tire-equipped vehicle wheels.

The present invention relates to an anti-skid device where a plurality of shoes are provided and mounted on the tire of a vehicle wheel. The shoes include rough surfaces for increasing the friction between the vehicle and a road surface thereby enabling travel of the vehicle on slick or icy roads.

Anti-skid devices have always been a problem to mount on a tire. The vehicle and the anti-skid device have to be manipulated in such a manner so that the device can be temporarily mounted upon the tire, the vehicle moved, another portion of the tire fitted with the device, and so on. A portion of the tire rests on the ground surface and the anti-skid device cannot be placed beneath the point of contact of the tire with the ground surface without manipulation of the vehicle. If the mounted portion of the device is rotated with the tire, it will fall from the tire periphery if not securely held in place.

Accordingly, it is an object of this invention to provide an anti-skid device which can be securely fastened to the tire of a vehicle in sections, thereby eliminating the possibility that the anti-skid device will fall from the vehicle tire during its mounting.

A still further object of this invention is to provide an anti-skid device for a vehicle tire which includes a novel lock for mounting the device on a vehicle tire.

Yet another object of this invention is to provide a sectional anti-skid device for mounting upon a vehicle tire which includes a lock for securely locking the sections of the device in place upon the tire at any portion along the periphery of the tire.

Another object of this invention is to provide an anti-skid device of the character indicated in which the lock associated wtih the anti-skid device aids in the generation of friction between the vehicle tire and a road surface.

Further objects and advantages of the invention will become apparent from the following description and claims, and from the accompanying drawings, wherein:

FIGURE 4 is an enlarged detailed view in side elevation of the bottom portion of the vehicle wheel and anti-skid device illustrated in FIGURE 1.

FIGURE 5 is a cross sectional view taken substantially along the plane indicated by the line 5—5 of FIGURE 4.

FIGURE 6 is an exploded perspective view of the lock used to mount the anti-skid shoes on a vehicle wheel and tire.

FIGURE 7 is a fragmentary top plan view of a portion of a reticulated shoe.

FIGURE 8 is a cross sectional view taken substantially along the plane indicated by the line 8—8 of FIGURE 7.

Figure 1:
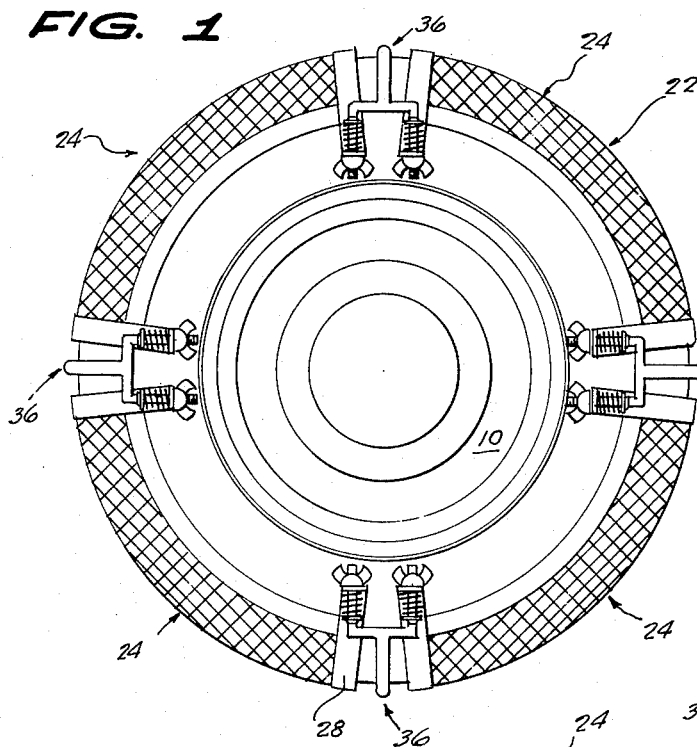
FIGURE 1 is a side view in elevation of a vehicle wheel and tire on which the anti-skid device of the present invention is mounted.

Referring now to the drawings in detail, wherein like numerals indicate like elements, a vehicle wheel 10 is shown, having a rim 12, in which a pneumatic tire 14 is mounted. The tire has the customary treads 16, and outboard and inboard side walls 18 and 28, respectively. An anti-skid device, generally designated by the numeral 22, is illustrated as being installed upon the tire 14.

The device 22 comprises diametrically opposed pairs of shoes 24 which are elongated arcuate channel forms of U-shaped cross section. The shoes 24 are, as shown in FIGURES 7 and 8, formed of reticulated flexible metal, of substantial thickness. The reticulations 26 are preferably diamond-shaped and evenly distributed in closely spaced relationship, with the edges thereof canted out of the plane of the shoes. Since the reticulated metal is canted out of the plane of the shoes, the shoes will bite into ice or snow, as well as muddy road surfaces, and provide for greater friction between the vehicle tire and the road surface.

Figure 2:
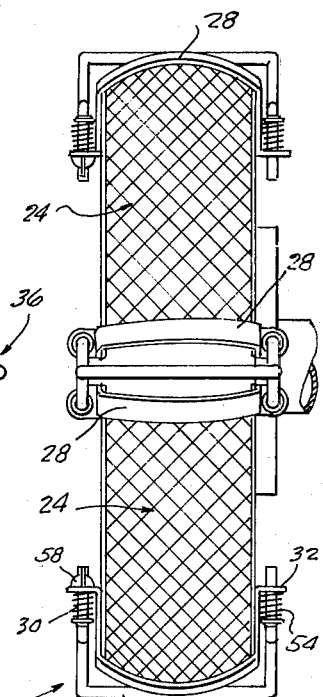
FIGURE 2 is an end view in elevation of the vehicle wheel and anti-skid device illustrated in FIGURE 1, as seen from the right-hand end of FIGURE 1.
Figure 3:
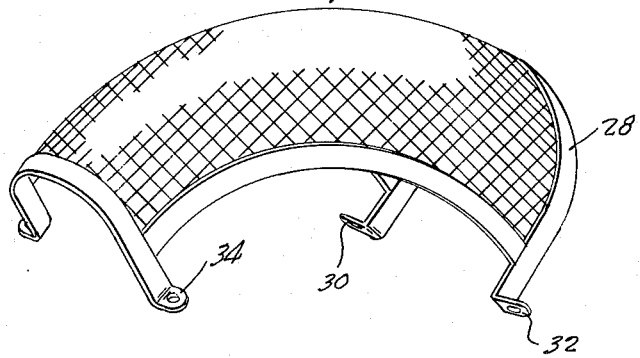
FIGURE 3 is a perspective view of one of the shoes which comprises a section of the anti-skid device of the present invention.

As shown in FIGURES 2 and 5, the shoes 24 are wider than the treads 16 of the tire 14, and reach to but do not significantly bear against the side walls 18 and 20 of the tire. The shoes 24 are spaced circumferentially about the wheel 10 and the ends of the shoes 24 terminate in inverted U-shaped end brackets 28. The brackets 28 include laterally extending lugs 30 and 32, each of which has an aperture 34, for a purpose which will become apparent hereinafter.

The shoes 24 are adapted to be individually mounted upon the tire 14 and securely locked in place, section by section. This will enable the user to mount a pair of shoes 24 and then move the vehicle and rotate each wheel so as to incrementally position a shoe about the circumference of the wheel.

In order to securely lock each shoe in place upon the tire 14, a lock generally indicated by the numreal 36 is provided. The lock 36 includes an inverted U-shaped element 38 including a bight portion 40 and a pair of parallel legs 42 and 44. The legs 42 and 44 terminate in bifurcated ends 46 and 48. The bifurcations 46 and 48 are disposed in a plane which is substantially perpendicular to the plane of the U-shaped element 38.

Each furcation includes an integral washer 50 and a threaded end portion 52. In mounting, a coil spring 54 is placed about each furcation and into abutment with the integral washer 50.

A pair of shoes 24 are disposed along the upper half of the tire 16 in circumferentially spaced relation. The lock 36 is then positioned so that the bight portion 40 of the U-shaped element 38 extends across the space between the circumferentially spaced shoes 24 and the bifurcated end 46 extends through the apertures 34 in juxtaposed lugs 32 while the bifurcated end 48 of the lock 36 extends through the apertures 34 in the juxtaposed lugs 30.

A washer 56 is then placed over each of the furcations extending through the aperture 34 in each of the lugs, and a wing nut 58 is threaded on portions 52 of each furcation. The coil springs 54 are held captive between the lugs 30, 32, respectively, whichever may be the case, and the integral washers 50. As the wing nuts 58 are threaded along the threaded end portions 52 of the furcations, the springs 54 will be compressed and will resiliently urge the end brackets 28 and juxtaposed shoes 24 into tight engagement with the tire 14.

When the first pair of shoes 24 has been connected to the tire 14, the vehicle is moved slightly to rotate the wheel 10 and another shoe 24 is connected to the tire 14, as described above. This process is repeated until the shoes 24 completely fill the circumference of the tire 14.

As an aid to the friction generated by the shoes 24, the bight portion 40 on each of the locks 38 is roughened or serrated. Hence, all skid-producing portions of the tire 14 are substantially covered.

Although there has been shown and described a preferred form of the invention, it is to be understood that the invention is not necessarily confined thereto, and that any change or changes in the structure of and in the relative arrangements of parts thereof are contemplated as being within the scope of the invention as defined by the claims appended hereto.

I claim:

1. Anti-skid apparatus comprising a plurality of elongated, channel-shaped shoes adapted to be circumferentially spaced about a vehicle wheel tire, a rough surface on each shoe, circumferentially spaced ends of adjacent shoes including a pair of laterally extending lugs each provided with an aperture, means for retaining said shoes upon a vehicle tire, said means including an inverted substantially U-shaped element adapted to extend across the space between adjacent shoes, each end of said element being bifurcated and disposed in a plane substantially perpendicular to the plane of said element for insertion within an aperture in a lug on each of a pair of adjacent shoes, and means for retaining said bifurcated ends within said apertures to retain said shoes on a vehicle tire.

2. Anti-skid apparatus in accordance with claim 1, wherein the portion of said U-shaped element extending across the space between adjacent shoes has a roughened surface.

3. Apparatus in accordance with claim 1, wherein said last-named means includes an integral washer on each furcation of said bifurcated ends of said U-shaped element, threads on each furcation, a coil spring disposed about each furcation between said washer and a shoe lug, and a nut threadedly connected on the threads on each furation.

4. Apparatus in accordance with claim 1 wherein said shoes are reticulated and have uniformly distributed openings, said openings being diagonally disposed diamond-shaped openings and canted out of the plane of said shoes.

5. Apparatus for locking a plurality of anti-skid shoes having laterally extending lugs in spaced relationship about the periphery of a vehicle wheel tire, said apparatus comprising an inverted, substantially U-shaped element adapted to be disposed across the space between a pair of adjacent anti-skid shoes mounted on a tire, each end of said element being bifurcated and disposed in a plane substantially perpendicular to the plane of said element, said bifurcated ends being adapted to be connected to the lugs on each of a pair of adjacent shoes for retaining said shoes together and locked to the periphery of a vehicle tire.

6. Apparatus for locking a plurality of anti-skid shoes having laterally extending lugs in spaced relationship above the periphery of a vehicle wheel tire, said apparatus comprising an inverted, substantially U-shaped element adapted to be disposed across the space between a pair of adjacent anti-skid shoes mounted on a tire, the portion of said U-shaped element adapted to extend across the space between a pair of adjacent anti-skid shoes having a roughened surface, each end of said element being bifurcated and disposed in a plane substantially perpendicular to the plane of said element, said bifurcated ends being adapted to be connected to the lugs on each of a pair of adjacent shoes for retaining said shoes together and locked to the periphery of a vehicle tire.

7. Apparatus for locking a plurality of anti-skid shoes having laterally extending lugs in spaced relationship about the periphery of a vehicle wheel tire, said apparatus comprising a bifurcated element adapted to be disposed between a pair of adjacent anti-skid shoes mounted on a tire, each end of said bifurcated element including means for connection to the lugs on each of a pair of adjacent shoes to retain said shoes together and locked to the periphery of a vehicle tire.

References Cited by the Examiner

UNITED STATES PATENTS

| 1,071,741 | 8/1913 | Hinson | 152—182 |
| 1,600,276 | 9/1926 | Dombowsky | 152—225 X |
| 3,031,000 | 4/1962 | Sebena | 152—218 |

EUGENE G. BOTZ, *Primary Examiner.*

ARTHUR L. LA POINT, *Examiner.*

C. W. HAEFELE, *Assistant Examiner.*